United States Patent
Lamm et al.

[11] Patent Number: 6,002,227
[45] Date of Patent: Dec. 14, 1999

[54] DEVICE AND PROCESS FOR ELECTRONIC MONITORING OF AN ADJUSTING DRIVE IN A VEHICLE

[75] Inventors: Hubert Lamm, Kappelrodeck; Guenter Haderer, Buehl, both of Germany

[73] Assignee: Robert Bosch GmbH, Stuttgart, Germany

[21] Appl. No.: 08/981,301

[22] PCT Filed: Mar. 6, 1997

[86] PCT No.: PCT/DE97/00424

§ 371 Date: Dec. 16, 1997

§ 102(e) Date: Dec. 16, 1997

[87] PCT Pub. No.: WO97/39508

PCT Pub. Date: Oct. 23, 1997

[30] Foreign Application Priority Data

Apr. 17, 1996 [DE] Germany ............. 196 15 127

[51] Int. Cl.⁶ .................................................. G05B 5/00
[52] U.S. Cl. .................................... 318/468; 49/27
[58] Field of Search ................... 49/26, 27, 28; 160/292, 293.1; 296/210, 212, 213, 216.1; 318/280, 281, 282, 283, 284, 285, 286, 466, 467, 468, 469, 481; 454/69, 74, 75

[56] References Cited

U.S. PATENT DOCUMENTS

| | | | |
|---|---|---|---|
| 4,773,183 | 9/1988 | Okushima | 49/28 |
| 4,991,145 | 2/1991 | Goldstein et al. | 318/94 |
| 5,051,672 | 9/1991 | Yaguchi | 318/286 |
| 5,185,562 | 2/1993 | Huyer | 318/466 |
| 5,537,013 | 7/1996 | Toyozumi et al. | 318/283 |
| 5,701,063 | 12/1997 | Cook et al. | 318/286 |
| 5,764,008 | 6/1998 | Hahn et al. | 318/466 |

FOREIGN PATENT DOCUMENTS

| | | |
|---|---|---|
| 4020351A | 1/1992 | Germany . |
| 4446117A | 7/1995 | Japan . |

*Primary Examiner*—Robert E. Nappi
*Assistant Examiner*—Rina I. Duda
*Attorney, Agent, or Firm*—Venable; Norman N. Kunitz

[57] ABSTRACT

An apparatus and a method are proposed which serve to correct a limit value (16) of the closing force limitation, particularly for a sliding roof. The apparatus and the method comprise an air pressure sensor (14) from whose signals are determined a reference pressure (19) by means of averaging and pressure changes as deviations from this reference pressure. An electronic control unit (12) changes the limit value (16) of the closing force limitation as a function of the pressure conditions.

12 Claims, 1 Drawing Sheet

DEVICE AND PROCESS FOR ELECTRONIC MONITORING OF AN ADJUSTING DRIVE IN A VEHICLE

STATE OF THE TECHNOLOGY

The invention starts from an apparatus and a method for electronically monitoring an adjusting drive arranged in a vehicle according to the generic type having an electronic controller for the adjusting drive which compares the force on the adjusting drive with a supplied limit value for of the closing force limitation of the adjusting drive. DE-A 40 20 351 already discloses a method for the electronic monitoring and control of the opening process and the closing process of electrically operated units, in which method accelerating forces, particularly in the vertical direction, are detected by means of a sensor which must be additionally installed.

SUMMARY AND ADVANTAGES OF THE INVENTION

The apparatus according to the invention and the method according to the invention for electronically monitoring an adjusting drive arranged in a vehicle via an air pressure signal offer the advantage that a limit value of the closing force limitation is matched to the speed-dependent force and pressure conditions via an air pressure signal which is picked up by an air pressure sensor. In this manner, faulty triggering due to high pressure differences, for example, at the sliding roof as a result of a high vehicle speed can be reduced.

Advantageous modifications and features are possible by way of the measures that are respectively cited in the dependent claims.

The apparatus and the method are preferably employed for a sliding roof at whose cover the pressure change results in a build-up of forces and for window lifters because, in the event of changes relative to a reference pressure, the limit value is increased and the risk of faulty triggering is therewith reduced.

BRIEF DRAWING OF THE DRAWING

DETAILED DESCRIPTION OF THE PREFERRED EMBODIMENT

Figure 1:
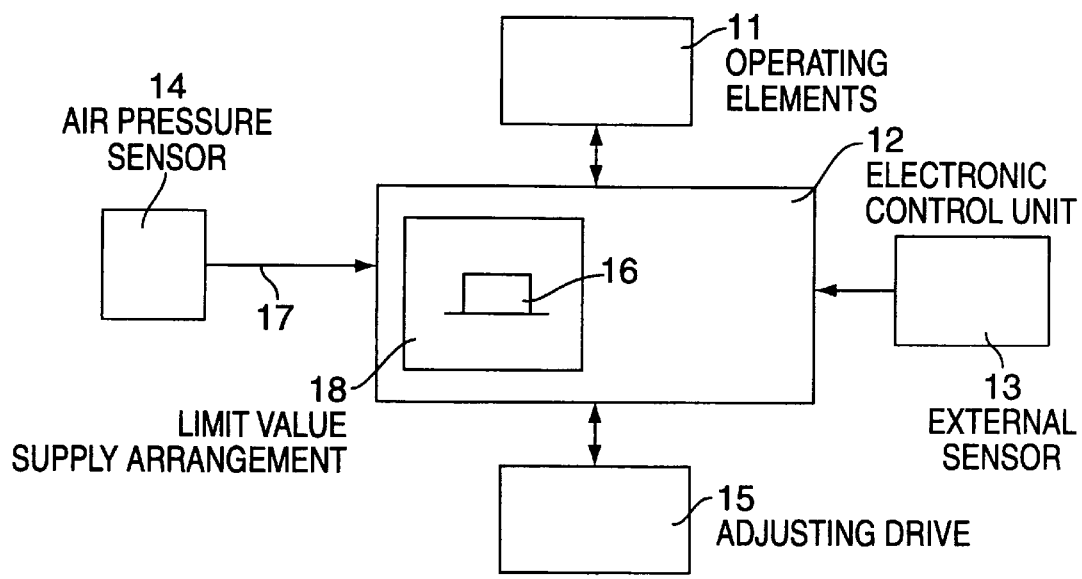
FIG. 1 illustrates a embodiment of an apparatus according to the invention.

FIG. 1 comprises an electronic control unit 12 an arrangement 18 for supplying at least one limit value of the closing force limitation which generates a limit value 16 of the closing force limitation. Supplied to the electronic control unit 12 are an air pressure signal 17 generated by an air pressure sensor 14 as well as signals that are generated by an external sensor device 13, an adjusting drive 15 and operating elements 11. The electronic control unit 12 emits signals to the operating elements 11 and to the adjusting drive 15.

Figure 2:
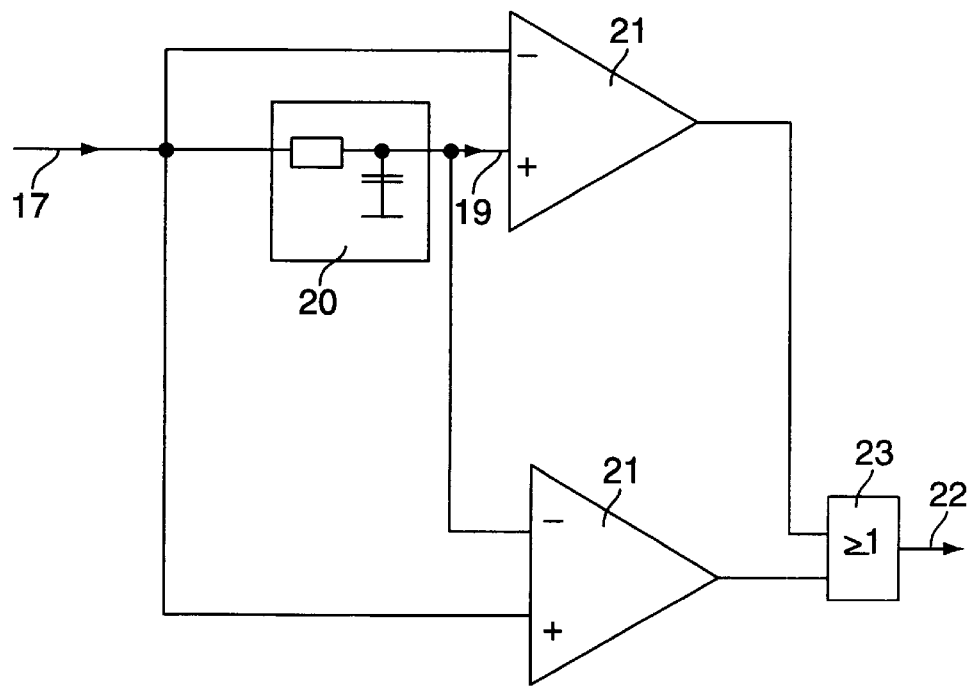
FIG. 2 shows a schematic circuit diagram of an air pressure signal processing system.

FIG. 2 illustrates two comparators 21 which are oppositely connected with the air pressure signal 17 and a reference pressure 19, formed by a low pass filter 20. The two comparator output signals are linked by an OR gate 23 and form a processed air pressure signal 22.

The arrangements illustrated in FIGS. 1 and 2 operate as follows:

The desired operating mode such as, for example, the closing of a sliding roof, is communicated to the electronic control unit 12 by means of the operating elements 11. The electronic control unit 12 checks whether a criterion for jamming is present, that is, whether the limit value 16 determined by the arrangement 18 for supplying at least one limit value of the closing force limitation has been reached or exceeded by the actual value. If the electronic control unit 12 has recognized the adjusting drive 15 as being jammed, the adjusting drive 15 is stopped or reversed. This is intended to rule out damage to a person who got caught in the closing region or to the adjusting drive 15. Certain situations result in faulty triggering, particularly if, for example, large forces act on the adjusting drive 15 for a short time. This may be the case at high speeds of a sliding roof disposed in the lifting position or as a result of jolting movements caused by unevenness in the ground.

This faulty triggering is reduced with the present invention by considering the pressure conditions by means of the air pressure signal 17 in that the arrangement 18 uses the air pressure signal 17 to correct the limit value 16. In the event of a pressure change, the arrangement 18 puts out a higher limit value. It is assumed that the pressure change has occurred as a result of the higher vehicle speed. The greater force expenditure for the adjusting drive 15 cannot be attributed to a jam. For this reason it is justified to increase the limit value 16 of the closing force limitation.

As air pressure sensor 14, for example, a piezoresistive semiconductor pressure gage emits an analog or digitized signal which is used to change the limit value 16 as a function of the pressure.

Instead of the air pressure signal 17, the arrangement 18 can also be supplied with the processed air pressure signal 22 which is generated as follows. In order to detect the reference pressure independently of location, temperature and weather, the air pressure signal 17 is used to generate the reference pressure according to FIG. 2. Several procedures are proposed. In case of analog signal processing, the air pressure signal 17 feeds the low pass filter 20 which emits the reference pressure 19 as a preferably exponential averaging of the air pressure signal 17. If, as a result of the closing process of the sliding roof, the pressure changes greatly, one of the two comparators connected with the reference pressure 19 and the air pressure signal 17 supplies a rising edge as a processed air pressure signal 22 which serves as a pulse for the arrangement 18 to increase the limit value 16. If necessary, a voltage source which is proportional to the permissible air pressure change must be inserted as a response threshold. The value of the pressure change, for example, might also serve as a measure for the change of the limit value 16. The mean value of the analog air pressure signal 17 as a reference pressure 19 can also be determined by means of real time averaging in that the air pressure signal 17 is converted into pulses by means of a voltage/frequency converter, with the number of the pulses during a measuring interval being proportional to the average value. As a further method, the sliding averaging supplies an algorithm for determining the reference pressure. The arrangement 18 might also be supplied with a pulse by differentiation of the continuously detected air pressure signal 17, which pulse triggers the change of the limit value 16.

In a further embodiment, the position detection of the adjusting drive 15 serves the purpose of permitting the change of the limit value 16 via the processed air pressure signal 22 only for a specific range in order to do justice to position-dependent load behaviors.

The present invention is particularly suitable for the adjusting drive 15 of a sliding roof or of a window lifter.

We claim:

1. An apparatus for the electronic monitoring of an adjusting drive in a motor vehicle, said apparatus comprising:

a control unit for the adjusting drive, said control unit receiving at least an input signal corresponding to the force on the adjusting drive and including an arrangement for supplying at least one limit value signal for the closing force limitation for the adjusting drive, and a comparator for comparing the limit value signal with the force signal to provide a control signal for the adjusting drive, and an air pressure sensor for detecting the pressure of the air and for supplying an air pressure signal corresponding to the detected pressure to said arrangement to correct the limit value signal for the comparator.

2. An apparatus according to claim 1, including a circuit for forming a pressure deviation relative to reference pressure and for supplying same to the arrangement as a processed said air pressure signal.

3. An apparatus according to claim 2, wherein the said circuit forms the pressure deviations relative to a reference pressure and supplies same to the arrangement as a function of the position of the adjusting drive.

4. An apparatus according to claim 3, wherein the circuit includes means for forming the reference pressure through averaging of the detected pressure signal.

5. An apparatus according to claim 4, wherein the means for forming the reference pressure through averaging is a low pass filter.

6. An apparatus according to claim 1, wherein the adjusting drive is connected to a sliding roof of a motor vehicle.

7. A method for the electronic monitoring of an adjusting drive arranged in a vehicle, comprising the steps of:

comparing the force on the adjusting drive with a limit value for the closing limitation for the adjusting drive;

measuring the air pressure in the interior space of the vehicle; and correcting the limit value as a function of the measured air pressure.

8. A method according to claim 7, wherein the step of connecting includes correcting the limit value using a processed air pressure corresponding to a pressure deviation relative to a reference pressure.

9. A method according to claim 8, wherein the pressure deviations relative to a reference pressure are a function of the position of the adjusting drive.

10. A method according to claim 8, wherein the reference pressure is formed through averaging of the measured air pressure.

11. A method according to claim 10, wherein the averaging is carried out by passing a signal corresponding to the measured pressure through a low pass filter.

12. A method according to claim 7 further comprising using the method for the adjusting drive for a sliding roof of a motor vehicle.

* * * * *